United States Patent
Glance et al.

(10) Patent No.: US 6,389,372 B1
(45) Date of Patent: May 14, 2002

(54) SYSTEM AND METHOD FOR BOOTSTRAPPING A COLLABORATIVE FILTERING SYSTEM

(75) Inventors: Natalie S. Glance, Meylan; Manfred Dardenne, Grenoble, both of (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/342,862

(22) Filed: Jun. 29, 1999

(51) Int. Cl.[7] ............................................... G06F 15/00
(52) U.S. Cl. ..................................................... 702/189
(58) Field of Search ....................... 705/27, 10; 725/91; 702/189; 382/211, 130

(56) References Cited

U.S. PATENT DOCUMENTS

| | | | |
|---|---|---|---|
| 3,905,045 A | * 9/1975 | Nickel | 382/130 |
| 4,996,642 A | * 2/1991 | Hey | 705/27 |
| 5,175,775 A | * 12/1992 | Iwaki et al. | 382/211 |
| 5,704,017 A | * 12/1997 | Heckerman et al. | 706/12 |
| 5,724,567 A | * 3/1998 | Rose et al. | 707/2 |
| 5,790,426 A | * 8/1998 | Robinson | 705/10 |
| 5,790,935 A | * 8/1998 | Payton | 725/91 |
| 5,794,237 A | * 8/1998 | Gore, Jr. | 707/5 |
| 5,799,318 A | * 8/1998 | Cardinal et al. | 707/101 |
| 5,884,282 A | * 3/1999 | Robinson | 705/27 |
| 6,321,179 B1 | * 11/2001 | Glance et al. | 702/189 |

FOREIGN PATENT DOCUMENTS

GB 1065607 A2 * 6/1999 ........... G06F/17/30

OTHER PUBLICATIONS

GroupLens: An Open Architecture for Collaborative Filtering of Netnews, Paul Resnick, Neophytos Iacovou, Mitesh Suchak, Peter Bergstrom, John Riedl, From Proceedings of ACM 1994 Conference on Computer Supported Cooperative Work, Chapel Hill, NC.*

Natalie Glance, Damian Arregui and Manfred Dardenne, Knowledge Pump: Supporting the Flow and Use of Knowledge, 1998, pp. 35 through 51.

* cited by examiner

Primary Examiner—Thomas Black
Assistant Examiner—Michael B. Holmes
(74) Attorney, Agent, or Firm—Jeannette M. Walder

(57) ABSTRACT

A system and method of predicting a user's rating of a new item in a collaborative filtering system in which an initial set of correlation coefficients for the intended users is used to bootstrap the system is described. The users are members of a predetermined organization and the initial correlation coefficient for each pair of users is based on the organizational relationship between the users. Prior organizational relationship information pertaining to the strength of ties, such as a formal organization chart and social network maps built using interviews or deduced from observed (online and/or offline) interaction patterns between potential users, is used to bootstrap the filtering system. Correlation coefficients can be updated as users rate or rerate items in the system.

25 Claims, 6 Drawing Sheets

SYSTEM AND METHOD FOR BOOTSTRAPPING A COLLABORATIVE FILTERING SYSTEM

FIELD OF THE INVENTION

This invention relates generally to automatic collaborative filtering systems for predicting a user's level of interest in new information, and more particularly to a system and method of bootstrapping or cold starting a collaborative filtering system.

BACKGROUND OF THE INVENTION

The amount of information that is available globally, via the World Wide Web or the Internet, or locally on some Intranets, is so large that managing such information is critical. One way of managing and distributing information is to use a collaborative filtering system to predict a user's preference and use that information to distribute new information to the user.

Collaborative filtering, the sharing of knowledge through recommendations, is an important vehicle for distributing information. There are two distinct types of collaborative filtering mechanisms: those which enable active collaborative filtering by making it easier for people to share pointers to interesting documents and those which automate collaborative filtering by using statistical algorithms to make recommendations based on correlations between personal preferences.

Collaborative filtering systems are of particular value to suppliers of goods and services in that they can be used to enhance the distribution of their goods and services to customers. Automated collaborative filtering (ACF) is a general type of statistical algorithm that matches items (such as movies, books, music, news articles, etc.) to users by first matching users to each other. ACF uses statistical algorithms to make recommendations based on correlations between personal preferences. Recommendations usually consist of numerical ratings input manually by users, but can also be deduced from user behavior (e.g., time spent reading a document, actions such as printing, saving or deleting a document). The premise of such systems is that a user is going to prefer an item that is similar to other items chosen by the user and by other users.

U.S. Pat. No. 5,724,567 to Rose et al., entitled System for Directing Relevance Ranked Data Objects to Computer Users, describes a system for matching a user's interests by comparing the content of an item with a user's adaptive profile. Feedback is also available to enable the user to update his/her profile.

U.S. Pat. No. 5,704,017 to Heckerman et al., entitled Collaborative Filtering Utilizing a Belief Network, describes a form of adaptive ACF in which the system compares predictions with actual scores and performs adjustments to make the predictions come in line with the known scores.

However, automated collaborative filtering systems such as the above suffer from the cold-start problem: early users will receive inaccurate predictions until there is enough usage data for the algorithm to be able to learn their preferences. In prospective applications of ACF technology, such as knowledge management tools for organizations, consistent high quality service is key. Many existing current systems which employ ACF (MovieLens, Amazon.com, BarnesandNoble, etc.) either require users to rate a number of items before they will provide recommendations, use data from purchases, or provide initial predictions which are not personalized (e.g., use the average rating).

Knowledge Pump is a Xerox system which employs a push methodology of sharing knowledge where users are connected by a central knowledge repository with software tracking their interests and building up information that is sent to appropriate users. In Knowledge Pump the system is seeded with a skeletal social network of the intended users, a map of the organization's domains of interest and a collection of recommended items. For example, user-provided lists of immediate contacts or friends—people whose opinion the user tends to particularly value—may be used. See Glance et al., "Knowledge Pump: Supporting the Flow and Use of Knowledge," in *Information Technology for Knowledge Management*, Eds. U. Borghoff and R. Pareschi, New York: Springer-Verlag, pp. 35–45, 1998.

Note that even when ACF is feasible, it does not necessarily yield accurate predictions. The accuracy of the prediction depends on the number of items rated in common by pairs of users X and Y, the number of ratings available for the item and the number of other items each rater of that item has rated.

In many systems such cold-starting techniques are not always acceptable to users. Few users want to take the time to provide initial ratings and thus may lose interest in using the system. In some systems using "average data" may not be useful in providing recommendations. Other systems, especially new systems, may have no related data from which to extrapolate a user's interests or no means of acquiring the seed data.

There is a need for a system and a method of bootstrapping an ACF system that provides accurate estimates beginning with initial operation of the system. There is also a need for a system and method of bootstrapping an ACF system that is easily updated as users continue to use the system and method. There is a need for a system and method of bootstrapping an ACF system that is particularly useful for Intranets.

SUMMARY OF THE INVENTION

A method of predicting a user's rating of a new item in a collaborative filtering system, according to the invention, includes providing an initial set of correlation coefficients for the intended users. The users are members of a predetermined organization and the correlation coefficient for each pair of users is based on the organizational relationship between the users. Once the system is seeded with a set of correlation coefficients for the intended users, when a new item is presented, the system calculates a prediction for item. If other users in the system have rated the item, a predicted user rating is calculated. The predicted user rating calculation is the weighted average of all ratings for the item, using the correlation coefficients.

In an organizational setting, there are many kinds of prior organizational relationship information available concerning the population of users. One such predetermined organizational relationship includes the strength of ties between potential users. Examples of organizational data include a formal organization chart and social network maps built using interviews or deduced from observed (online and/or offline) interaction patterns. Such data is generally readily available in an Intranet setting, and may also be inferred for an Internet setting.

A collaborative filtering system for predicting a user's rating for an item, according to the invention includes a memory and a processor. The memory stores a correlation coefficient for each user in the system or the data necessary for calculating the correlation coefficients. The correlation coefficient is a measure of the similarity in ratings between pairs of users in the system who have rated a particular item. The memory also stores ratings for the item made by other users in the system. The processor calculates the weighted average of all the ratings for the item, wherein the weighted average is the sum of the product of a rating and its respective correlation coefficient divided by the sum of the correlation coefficients to provide a predicted user rating. The users are members of a predetermined organization and the initial value of the correlation coefficient for each pair of users in the system comprises a predetermined organizational relationship among the users.

Once the collaborative filtering system is up and running, the initial the values for the correlation coefficients can be updated as users provide ratings to items. To provide further accuracy in the correlation coefficients, and thus in the resulting prediction and recommendation, the correlation coefficients can be updated when a user changes his/her rating for a particular item. This is accomplished by backtracking, i.e., removing the prior rating and replacing it with the new rating, then recalculating the affected correlation coefficients.

Preferably, ratings are provided in the form of enumerated values (such as 0,1,2,3,4,5). This guarantees that correlations are always defined (no division by zero). Also, preferably, predictions are calculated about a threshold value or constant (such as the midpoint or average of the enumerated values, 2.5).

DETAILED DESCRIPTION OF THE PREFERRED EMBODIMENTS

Figure 1:
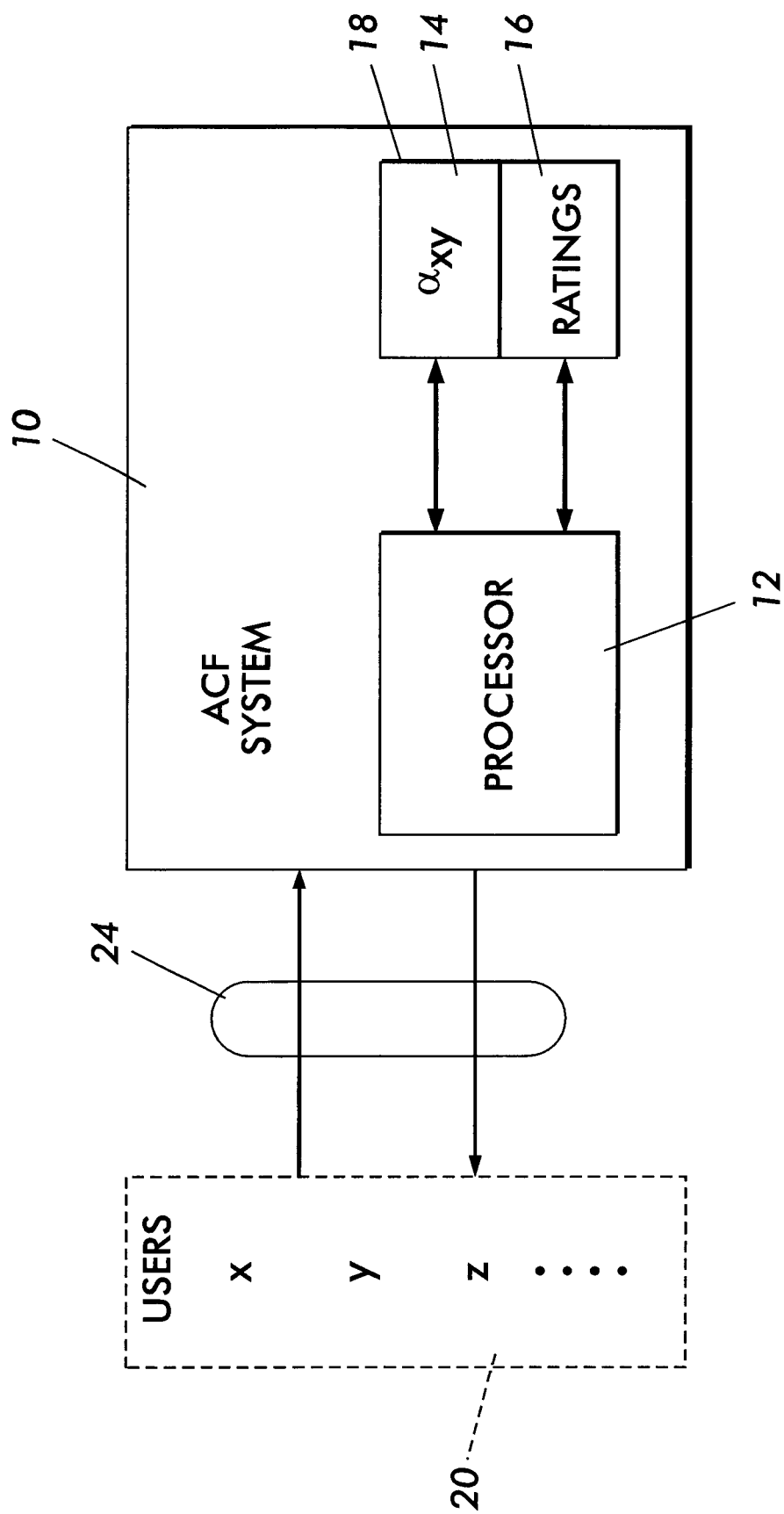
FIG. 1 is a block diagram of a collaborative filtering system according to the invention.

Referring now to the drawings, and in particular to FIG. 1, a collaborative filtering system according to the invention is generally shown and indicated by reference numeral 10. ACF system 10 includes processor 12 and memory 18. Correlation coefficients $\alpha_{xy}$ and ratings ($S^i_x$, $S^i_y$) provided by the various users and others are stored in memory 18. When the system 10 first starts up, only initial correlation coefficients $\alpha_{xy}(0)$ need be stored. Subsequent values of $\alpha_{xy}$ can be stored or calculated in real-time from ratings ($S^i_x$, $S^i_y$) and the initial values $\alpha_{xy}(0)$. However, it should be noted that for incremental update, the correlation values need to be stored. Initially, the $\alpha_{xy}(0)$ for cold-starting the ACF system are provided in a manner described below. Initial ratings ($S^i_x$, $S^i_y$) may also be provided. The processor 12 performs various calculations described below: user prediction, correlation coefficient update, and user-applied ratings.

A group of users 20 may request and receive recommendations from, and provide ratings to, ACF system 10 via interface 20. Interface 24 may be via an Intranet or the Internet.

Prediction Method

User to user correlations are an essential part of an ACF system. A standard approach to ACF is to use the Pearson r Algorithm to calculate user to user correlations (correlation coefficients) from ratings data that has been provided by the users. These correlation coefficients are then used to predict a user's score for an item as a correlation-weighted average of all the ratings for the item. The standard Pearson r correlation coefficient used to measure the similarity between users from items they have both rated is given by the relationship:

$$r = \frac{\sum (S_x - \overline{S_x})(S_y - \overline{S_y})}{\sqrt{\sum (S_x - \overline{S_x})^2} \times \sqrt{\sum (S_y - \overline{S_y})^2}}, \quad (1)$$

where the sum is over all N items that users X and Y have rated in common, $S_x$ is X's rating for item S and $S_y$ is Y's rating for item S. The coefficient r ranges from −1, which indicates a negative correlation, to 0, which indicates no correlation, to 1 which indicates a positive correlation between both users. Many systems employing ACF tend to use a variation of this coefficient called the Constrained Pearson r Algorithm, which takes into account variations of ratings about a fixed point (usually the midpoint of the range). For example, if ratings range from 0 to 5, the constrained Pearson r coefficient would take into account variations around 2.5. Thus the relationship for determining the correlation coefficient $\alpha_{xy}$ between user X and user Y about a fixed point of $P_0$ is given by:

$$\alpha_{xy} = \frac{\sum (S_x - P_0)(S_y - P_0)}{\sqrt{\sum (S_x - P_0)^2} \times \sqrt{\sum (S_y - P_0)^2}}. \quad (2)$$

For a group of users, sometimes referred to as a community of users, such as in an Intranet setting, a set of values $\{\alpha_{xy}\}$ would be obtained, with separate correlation coefficients for each pair of users (X,Y).

To predict a user X's score for an item i, ACF calculates a weighted average of all the ratings on the particular item provided by other users Y in the system according to the following formula for the prediction, $P^i_x$:

$$P^i_x = P_0 + \frac{\sum_{y \in raters} (S^i_y - P_0)\alpha_{xy}}{\sum_y |\alpha_{xy}|}. \quad (3)$$

Preferably only enumerated values are used for the ratings (0,1,2,3,4,5) to ensure that the correlations are always defined (no division by zero).

Once a prediction for item i is obtained, the prediction can be used by a recommender system to make a recommendation to the user X. For example, if $P^i_x$ is less than the average or midpoint of the ratings, $P_0$, the recommender system would likely not recommend item i to user X. If the $P^i_x$ is greater than $P_0$, the recommender system would likely recommend the item i to user X. The recommender system may also use the predictions to rank the recommended items shown to the user.

Typically this prediction relationship (3) is modified to take into account only correlations above a certain threshold. In addition, in very large systems (especially those involving a community of users on the Internet) in order to reduce the computational complexity of this relationship, the sum is taken over a neighborhood of the N most highly correlated raters.

Correlation Coefficients

When a recommender system employing an ACF system is first set up, there are no ratings data and thus, no way to calculate user to user correlations. In order to calculate the correlation between two users, X and Y, they must have rated at least one item in common. Early on in the system's use and operation, it is very likely that when user Z rates an item i, it will not be possible to predict X's interest in that item, since X and Z have not rated anything in common. As more users in the system rate the item i and as X rates more items, the likelihood that X has rated some item in common with some user who has rated the item i increases.

Thus the ACF system must be bootstrapped with a set of user to user correlation coefficients and a set of prior user ratings. There are several preferred methods of estimating the initial values of user to user correlations, $\alpha_{xy}(0)$, and they may be obtained according to one or a combination of the methods described below.

The first method is to use a formal organizational chart among the intended users and scale the correlation by the number of steps, n, required to reach a common ancestor:

$$\alpha_{xy}(0)=\alpha_0^n, \text{ where } 0<\alpha_0<1. \quad (4)$$

For a pair of users, X and Y, with a common ancestor (e.g., manager), n=0. For a pair of users, where one user is an ancestor for the other (e.g., manager and managee), n is the number of levels separating the two. In terms of the prediction relationship, Equation (3), this scaling behavior implies that (at least initially) the average opinion of a cluster of size $$\frac{1}{\alpha_0}$$

has the same weight as the opinion of a single person who is one step closer in the organization. Thus, someone in the same workgroup is hypothesized to have the same influence as several people in another workgroup.

A second method is to provide a map of the competencies in an organization. This map can be used alone or in combination with the correlation relationship (4) to complement the organizational structure. The approach to collaborative filtering described herein, in fact, is community-centered. That is, the prediction process described above is iterated over a set of communities (or domains of interest). The bootstrapped correlation values can be different for each community. While the organizational chart will stay the same, the set of experts (higher ranked persons in the organization) will depend on the community. By default, all non-expert users would be given a higher default correlation with the experts, with the amount of correlation proportional to the expert's perceived level of competence. An advantage of taking into account experts is that they cut across the formal organizational structure.

Another method of bootstrapping correlation values is to ask users who their advisors are, that is, whose opinions they particularly trust and respect. These advisors could then be given an initially very high correlation with the user. Conversely, users could be asked for those people whose opinion they do not trust (a kind of "kill" file or contrary indicator). These "advisors" would be assigned very low default correlations. More generally, the system could include a method of allowing users to specify default correlations between themselves and anyone else in the organization. This same method could be used to dynamically "re-set" or tweak correlation values that the system has learned for the user.

The above methods can be easily combined, so that, for example, the initial correlation values are obtained first from the organizational chart and expert yellow pages and then modified according to user input. This combination can be thought of as an extended organization chart with informal links.

Obtaining organizational information in an Intranet setting, as noted above, should be easier than in a community of users across the Internet. In an Internet setting (and in an Intranet setting), data mining techniques may be employed to infer social relationships from co-citations (WWW pages, papers, etc.) and from browsing patterns (WWW, digital libraries). The strength of social ties inferred using these techniques could then be used to form the initial values for the correlation coefficients. When generating correlation coefficients from such techniques, care should be taken not to create too much of an initial bias towards individuals who are better represented electronically. To the extent the use of information technology may not be widespread enough in some organizations, data mining techniques may have to be supplemented in order to build a complete enough picture of the social network.

Figure 2:
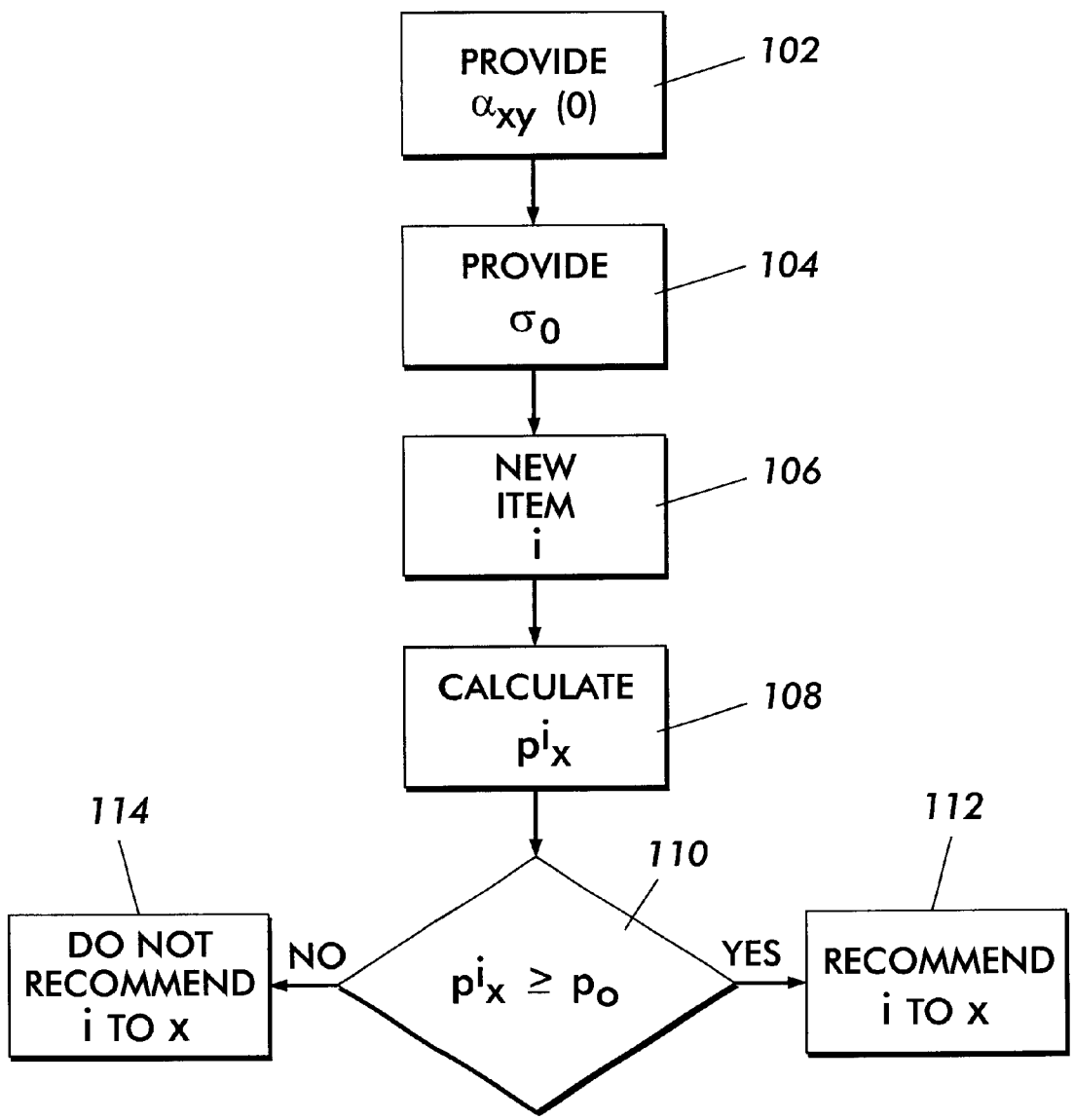
FIG. 2 is a flow chart of a method, according to the invention, of predicting a user's rating of a new item.

Referring to FIG. 2, a flow chart of the steps in making a recommendation using an ACF system is shown. In step 102, a set of initial correlation coefficients $\alpha_{xy}(0)$ is provided using one of the methods described above. In step 104, a set of prior user ratings (or estimates) is also provided. Preferably, the variance $\sigma_0$ for each user is also provided as part of the prior ratings. In step 106 a new item i, which has been rated by at least some of the other users in the community, is provided. In step 108 a prediction of how user X will rate item i is made. In step 110, if the rating is greater than a threshold value $P_0$, then the recommender system makes a recommendation to user X in step 112. If not, the recommender system does not make a recommendation in step 114.

Updating the Correlation Coefficients

As users continue to use the system, the user to user correlation values $\alpha_{xy}(0)$ must be updated to incorporate the ratings made by users for the same items in the system. A method for updating the correlation values using data about ratings for documents rated by X and Y as such data becomes available is also described below. To update the correlation value, the update relationship, with a parameterized weight accorded to the initial value, is obtained.

Figure 3:
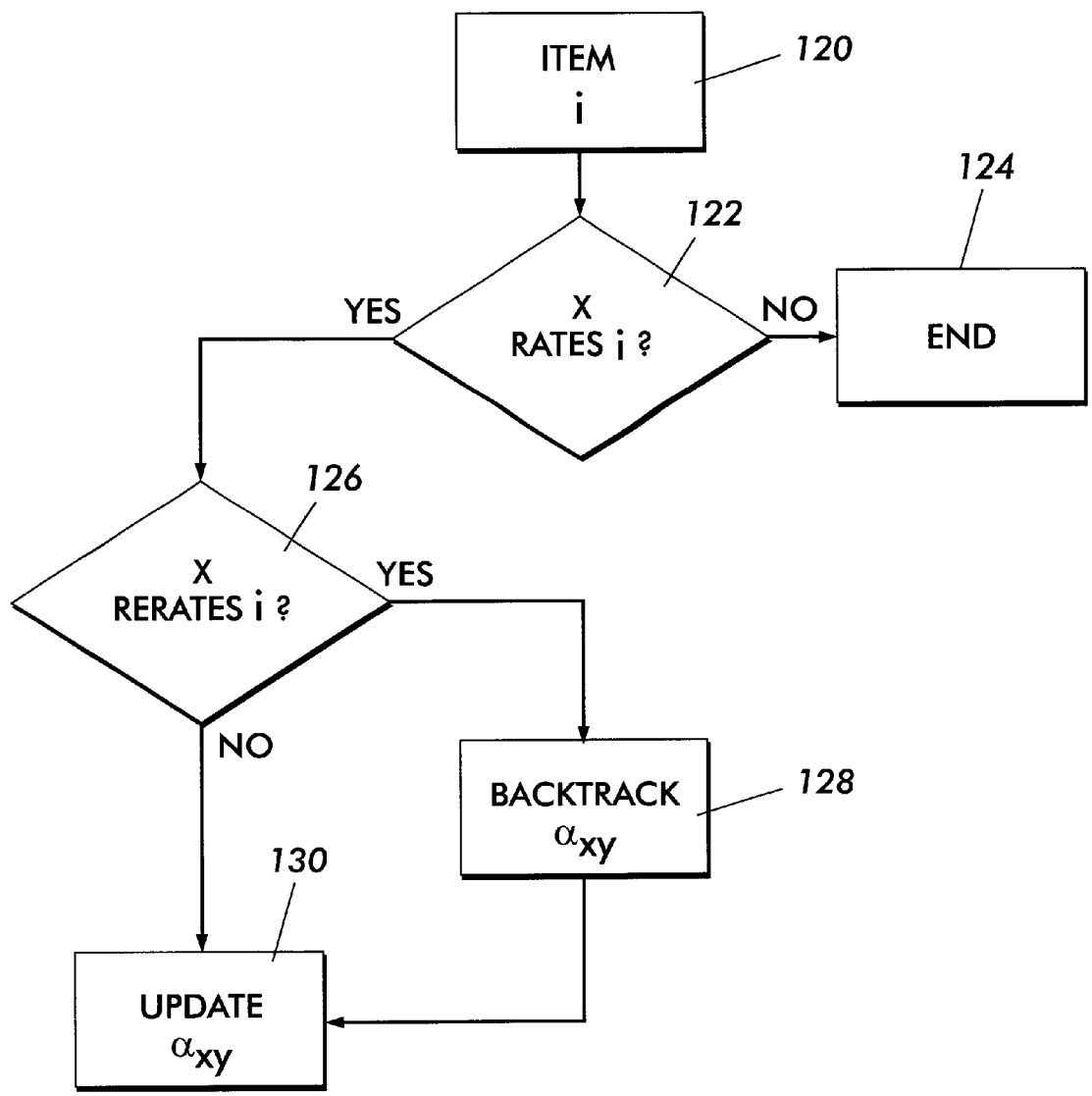
FIG. 3 is a flow chart of an overall method, according to the invention, of updating the correlation coefficients.

In addition to being a way to learn the correlation between X and Y over time, the update formula is a much more efficient way to calculate the correlation coefficient. Every time there is a new rating by X on an item that has also been rated by Y, the new correlation coefficient is calculated from the previous value using the update relationship. Referring to FIG. 3, a flow chart of the overall method of updating the correlation coefficients $\alpha_{xy}$ is shown. For each item i in step 120, a check is made in step 122 to determine if user X has provided a rating for item i. If not, the routine ends at step 124. If the user X does rate item i, the routine checks if X has previously rated the item i at step 126. If yes, the system backtracks the $\alpha_{xy}$ for all affected $\alpha_{xy}$ in step 128 (i.e., the system replaces the old rating for i with the new rating). Then in step 130 the routine updates the $\alpha_{xy}$ for all affected users Y who have rated item i in common with user X.

The update formula is obtained by expanding the correlation coefficient relationship (Equation 2) as a function of the previous correlation coefficient, the new rating pair, the variance of X's distribution of ratings on items in common with Y and the variance of Y's distribution of ratings in common with X (not including the new rating). The update relationship for the correlation coefficient is:

$$\alpha_{xy}(T_{xy}+1) = \frac{N\sigma_x(T_{xy})\sigma_y(T_{xy})\alpha_{xy}(T_{xy}) + (S_x - P_0)(S_y - P_0)}{(N+1)\sigma_x(T_{xy}+1)\sigma_y(T_{xy}+1)} \text{ where} \quad (5)$$

$$\sigma_x(T_{xy}+1) = \frac{\sqrt{N\sigma_x^2(T_{xy}) + (S_x - P_0)^2}}{\sqrt{N+1}} \quad \text{and} \quad (6)$$

$$\sigma_y(T_{xy}+1) = \frac{\sqrt{N\sigma_y^2(T_{xy}) + (S_y - P_0)^2}}{\sqrt{N+1}}$$

are the individual update formulas for X's and Y's ratings distributions, respectively over items rated in common. In equations (5) and (6), N is shorthand for a function of X, Y and $T_{xy}$: $N_{xy}(T_{xy})=N_0+T_{xy}$. $N_0$ is a parameter of the system which reflects the weight attributed to the prior estimate of the user-user correlation. In this embodiment with enumerated user choices (0,1,2,3,4,5 and $P_0$=2.5), we use a value for $N_0$ of between 5 and 10. Each time there is a new item which both X and Y have rated, $T_{xy}$ is incremented by one, starting from a value of 0 initially.

The update equation, Equation (5), is seeded with prior estimates of user to user correlations $\alpha_{xy}(T=0)$. Examples of preferred estimates for seeding the update equation (5) are described above. The update equation, Equation (5) is also seeded with a prior estimate of the standard deviation in user's ratings, which is taken to be independent of the user: $\sigma_x(T=0)=\sigma_y(T=0)=\sigma_0$ for all users X and Y. The value for $\sigma_0$ could be estimated using ratings data sets taken from other systems. It is expected that the initial value chosen for $\sigma_0$ to be about 20% of the range of the rating scale (i.e., somewhere between 0.5 to 1.5 for a six-point rating scale that goes from 0 to 5 as in the example above).

Figure 4:
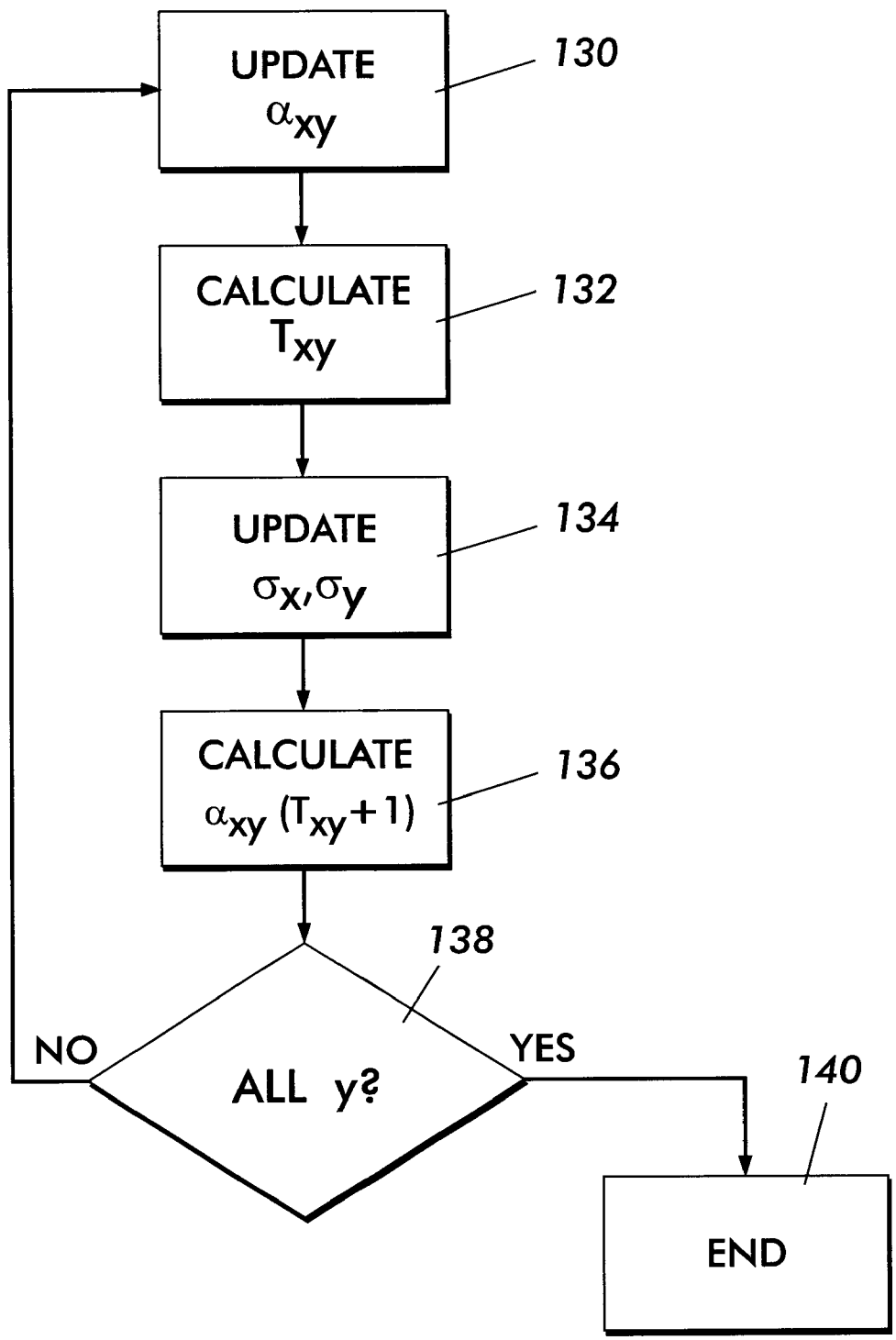
FIG. 4 is a flow chart of a method, according to the invention, of updating the correlation coefficients to take into account a new user rating.

Referring to FIG. 4, when a user provides a new rating for an item, the update routine 130 for updating $\alpha_{xy}$ is used. In step 132 the current value for $T_{xy}$ is obtained. Then the standard deviations $\sigma_x$ and $\sigma_y$ are updated in step 134 using Equations (6). Then $\alpha_{xy}(T_{xy}+1)$ is calculated in step 136 using Equation (5). At step 138 the routine checks if the $\alpha_{xy}$ have been updated for all users Y who have rated an item in common with user X. Once all the applicable $\alpha_{xy}$ have been updated, the routine ends at step 140.

To ensure an even more accurate update of the prediction relationship, the case in which either X or Y revises their rating must be considered. In this case, in order to calculate the current correlation coefficient between the two users X and Y, a backtrack formula must be used. The backtrack formula removes the effect of the previous rating pair and then updates the correlation coefficient in order to take into account the revised rating. The backtrack formula is:

$$\alpha_{xy}(T_{xy}-1) = \frac{N\sigma_x(T_{xy})\sigma_y(T_{xy})\alpha_{xy}(T_{xy}) - (S_x - P_0)(S_y - P_0)}{(N-1)\sigma_x(T_{xy}-1)\sigma_y(T_{xy}-1)} \quad (7)$$

Equation (7) depends upon using previously calculated values of the standard deviations in X's and Y's ratings distributions, which are given by:

$$\sigma_x(T_{xy}-1) = \frac{\sqrt{N\sigma_x^2(T_{xy}) - (S_x - P_0)^2}}{\sqrt{N-1}} \quad \text{and} \quad (8)$$

$$\sigma_y(T_{xy}-1) = \frac{\sqrt{N\sigma_y^2(T_{xy}) - (S_y - P_0)^2}}{\sqrt{N-1}}$$

In this case, $T_{xy}$ is not incremented, and N is shorthand for $N_0+T_{xy}$. Once the backtrack has been applied, then the update algorithms of Eqs. (5) and (6) are applied to obtain the revised correlation coefficient.

Figure 5:
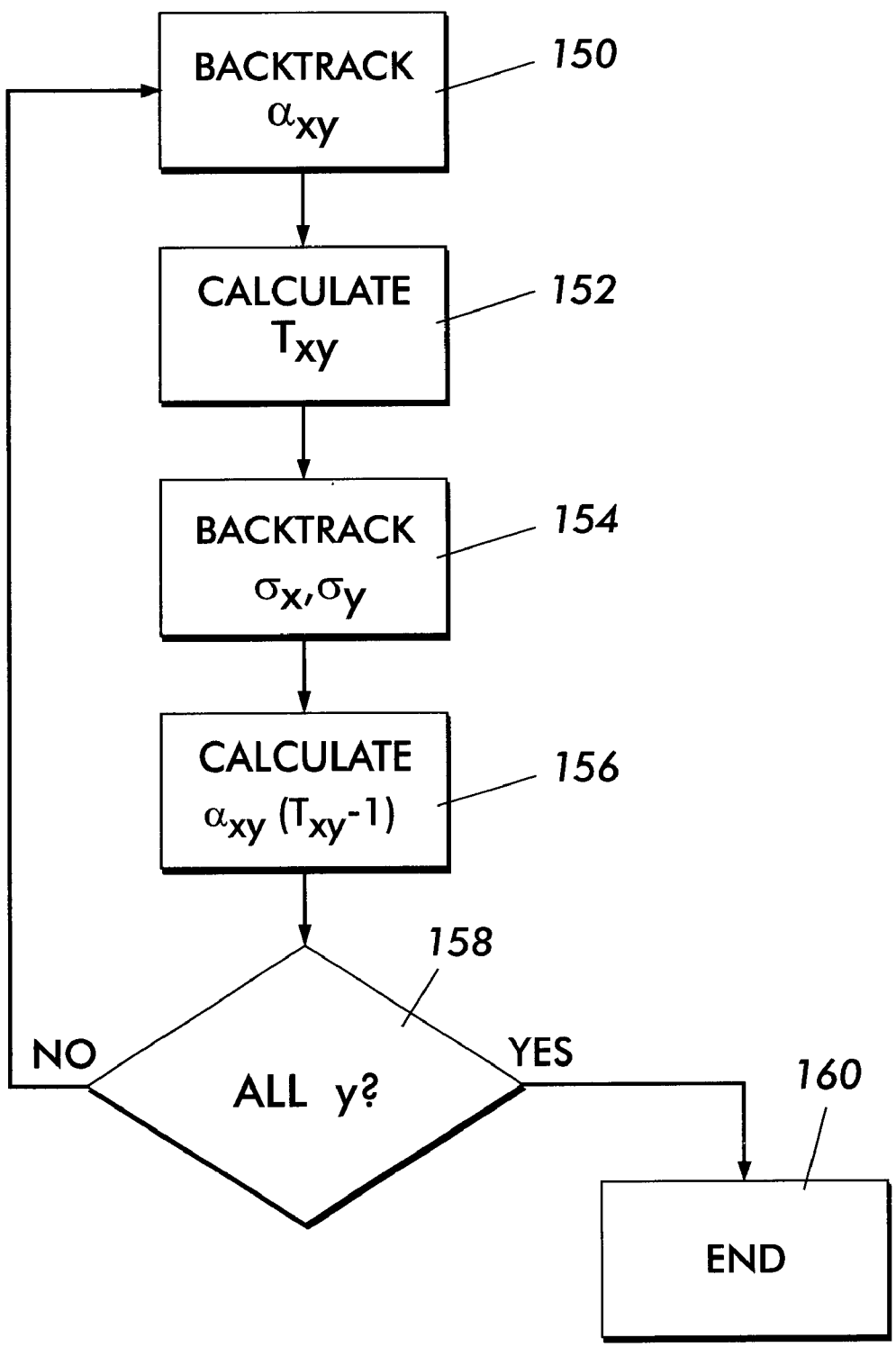
FIG. 5 is a flow chart of a method, according to the invention, of backtracking the correlation coefficients after a user has rerated a previously rated item.

Referring to FIG. 5, when a user provides a new rating for an item which he/she has previously rated, the backtrack routine 150 for backtracking $\alpha_{xy}$ is used. In step 152 the current value for $T_{xy}$ is obtained. Then the standard deviations $\sigma_x$ and $\sigma_y$ are backtracked in step 154 using Equations (8). Then $\alpha_{xy}(T_{xy}-1)$ is calculated in step 156 using Equation (7). At step 158 the routine checks if the $\alpha_{xy}$ have been backtracked for all users Y who have rated an item in common with user X. Once all the applicable $\alpha_{xy}$ have been backtracked, the routine ends at step 160.

In order to use the update relationship for the collaborative filtering system with the bootstrapped values, the following intermediate values must be saved (in a database in memory 18, for example) for each pair of users X and Y: $T_{xy}$, $\sigma_x$, $\sigma_y$ and $\alpha_{xy}$. The backtrack relationship requires saving all ratings by all users. Note that $\sigma_x$ and $\sigma_y$ are dependent on the pair X, Y since they take into account only documents rated by both X and Y. If, instead, the standard deviation over all items rated by the user (which would allow saving it once for all users instead of once for each pair) is calculated, the backtrack calculation for the correlation (Equation 7) could not be performed.

Storing the intermediate values entails a fair amount of memory, which size scales at worst with $M^2$, where M is the number of users. On the other hand, the correlation calculation decreases in complexity from $M^2 \times D$, where D is the number of documents or items, to a simple update calculation independent of M and D. Thus, the update algorithm has the additional benefit of potentially allowing predictions to be updated dynamically, instead of off-line as is more typically done.

Figure 6:
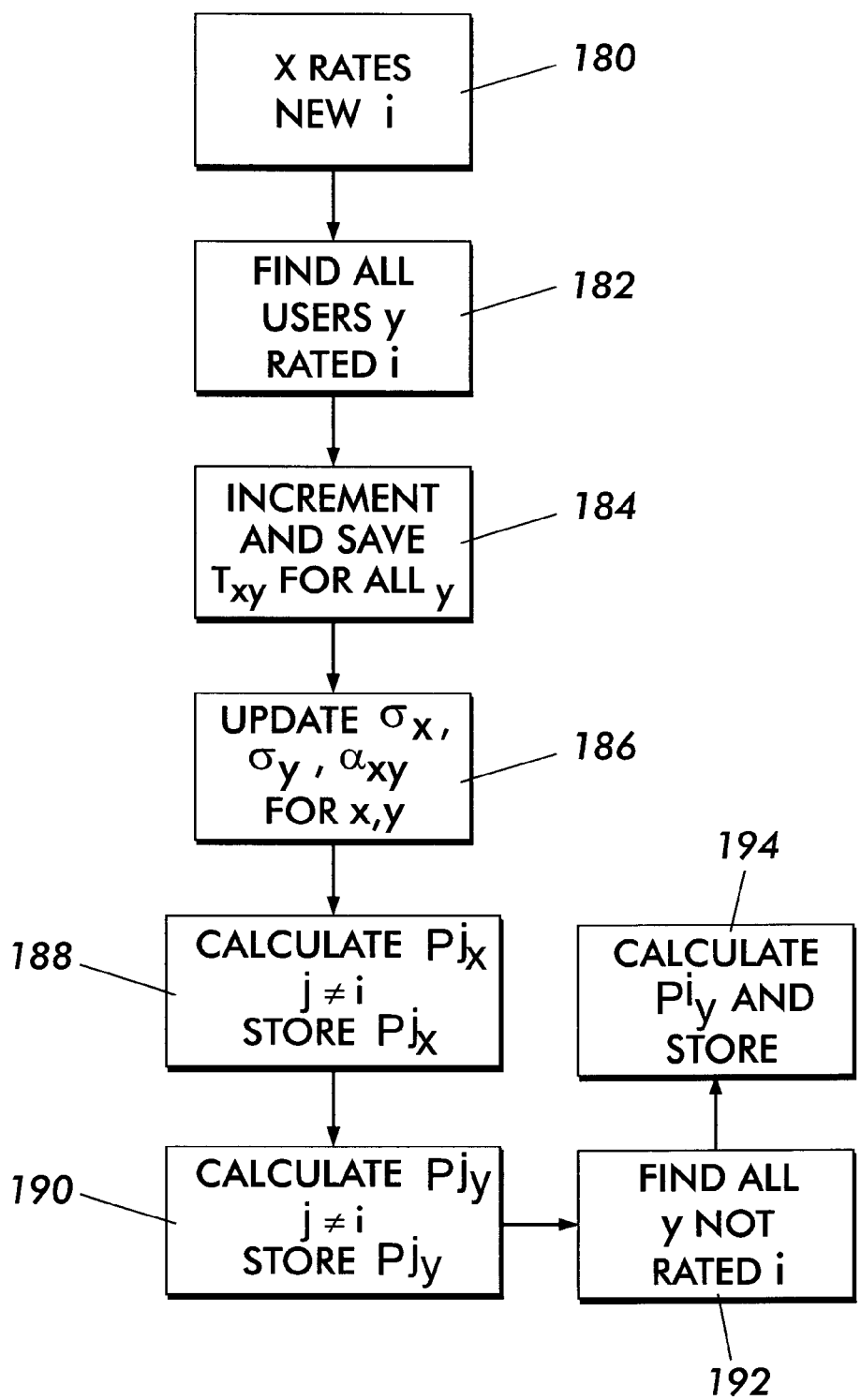
FIG. 6 is flow chart of another overall method, according to the invention, of updating the correlation coefficients.

Referring to FIG. 6, a flowchart of the procedure for updating correlation values and propagating the effect to the calculation of predictions is shown. For each new rating by user X of an item i the routine at step 180 is called. In step 182, all users Y who have also rated item i are determined. In step 184, increment and save $T_{xy}$ for all such users X and Y. In step 186, update and save $\sigma_x$, $\sigma_y$ and $\alpha_{xy}$, indexed by X and Y using Equations (5) and (6). In step 188, for all items j≠i, which Y has rated, but X has not, predict (and save) X's rating on j using Equation (3). In step 190, for all items j≠i, which X has rated, but Y has not, predict (and save) Y's rating on j using Equation (3). In step 192, find all users Y where Y has not rated i. In step 194, predict (and save) Y's rating on i using Equation (3).

For each second or later rating by user X of an item i, step 184 is skipped and step 186 is modified to include a backtrack calculation (using Equations (7) and (8)) before the update calculation. Note that in place of Equation (3) the update relationship Equation (5) can also be employed to calculate the predictions. If used, additional intermediate calculations would need to be saved that entail additional storage that scales with M×D. If storage is limited, the correlations can be calculated from the ratings data only by iterating over the following revised procedures.

The modified method is accomplished by iterating over the time-ordered list of ratings. For each new rating by user X of an item i, (1) Find all users Y where Y has also rated i.
(2) Increment $T_{xy}$.
(3) Update $\sigma_x$, $\sigma_y$ and $\alpha_{xy}$, indexed by users X and Y.

For subsequent ratings of user X of an item i, step (2) is skipped and step (3) is modified to include an update step. All predictions for all users on all unrated documents can then be calculated in one pass.

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of predicting a user's rating for an item in a collaborative filtering system, comprising:
   providing a correlation coefficient for each pair of users in the system, wherein the correlation coefficient is a measure of the similarity in ratings between pairs of users who have rated a particular item;
   determining ratings for items rated by other users in the system;
   calculating the weighted average of all the ratings for the item, wherein the weighted average is the sum of the product of a rating and its respective correlation coefficient divided by the sum of the correlation coefficients to provide a predicted user rating;
   wherein the plurality of users are members of a predetermined organization; and
   wherein the correlation coefficient for each user in the system comprises a predetermined organizational relationship among the users.

2. The method of claim 1, wherein the predetermined organizational relationship comprises an organizational chart among the users and wherein the initial correlation coefficient between a pair of users is a function of the number of levels between the pair.

3. The method of claim 1, wherein the predicted user rating of an item i for a user X is calculated in accordance with the relationship:

$$P_0 + \frac{\sum_{y \in raters} (S_y^i - P_0)\alpha_{xy}}{\sum_y |\alpha_{xy}|},$$

where $S_y^i$ is the rating of each user Y who has rated the item i, $P_0$ is a predetermined value and $\alpha_{xy}$ is the correlation coefficient between the user X and the user Y.

4. The method of claim 3, wherein the initial correlation coefficient for each pair of users X and Y in the system comprises the relationship $\alpha_{xy}(0) = \alpha_0^n$, where $0 < \alpha_0 < 1$, where n is the number of levels separating user X and user Y.

5. The method of claim 1, further comprising:
   providing a map of competencies among the users in the organization.

6. The method of claim 1, wherein the correlation coefficient for each pair of users in the system further comprises user specified correlations between pairs of users in the organization.

7. The method of claim 1, further comprising:
   receiving a user rating for the item; and
   using the user rating to update the user's correlation coefficients with other users.

8. The method of claim 3, further comprising:
   updating the correlation $\alpha_{xy}$ in accordance with the relationship:

$$\alpha_{xy}(T_{xy}+1) = \frac{N\sigma_x(T_{xy})\sigma_y(T_{xy})\alpha_{xy}(T_{xy}) + (S_x - P_0)(S_y - P_0)}{(N+1)\sigma_x(T_{xy}+1)\sigma_y(T_{xy}+1)} \text{ where}$$

$$\sigma_x(T_{xy}+1) = \frac{\sqrt{N\sigma_x^2(T_{xy}) + (S_x - P_0)^2}}{\sqrt{N+1}},$$

$$\sigma_y(T_{xy}+1) = \frac{\sqrt{N\sigma_y^2(T_{xy}) + (S_y - P_0)^2}}{\sqrt{N+1}}$$

are the individual update formulas for user X's and user Y's ratings distributions, respectively over items rated in common, $T_{xy}(0)$ is the weight attributed to a prior estimate of the user X to user Y correlation, and N is a function of the users X and Y and $T_{xy}$.

9. The method of claim 7, further comprising:
   for each updated rating of an item rated in common by X and Y, backtracking to remove the effect of the prior rating.

10. The method of claim 9, wherein the prior rating pair is removed in accordance with the relationship:

$$\alpha_{xy}(T_{xy}-1) = \frac{N\sigma_x(T_{xy})\sigma_y(T_{xy})\alpha_{xy}(T_{xy}) - (S_x - P_0)(S_y - P_0)}{(N-1)\sigma_x(T_{xy}-1)\sigma_y(T_{xy}-1)}, \text{ where}$$

$$\sigma_x(T_{xy}-1) = \frac{\sqrt{N\sigma_x^2(T_{xy}) - (S_x - P_0)^2}}{\sqrt{N-1}},$$

$$\sigma_y(T_{xy}-1) = \frac{\sqrt{N\sigma_y^2(T_{xy}) - (S_y - P_0)^2}}{\sqrt{N-1}}$$

are the individual update formulas for user X's and user Y's ratings distributions, respectively over items rated in common, $T_{xy}$ is the weight attributed to the prior estimate of the user to user correlation, and N is a function of the users and $T_{xy}$.

11. A collaborative filtering system for predicting a user's rating for an item, comprising:
   a memory storing:
      a correlation coefficient for each pair of users in the system, wherein the correlation coefficient is a measure of the similarity in ratings between pairs of users in the system who have rated at least one item in common; and
   ratings for the item made by other users in the system;
   a processor for calculating the weighted average of all the ratings for the item, wherein the weighted average is the sum of the product of a rating and its respective correlation coefficient divided by the sum of the correlation coefficients to provide a predicted user rating;

wherein the users are members of a predetermined organization; and wherein the correlation coefficient for each user in the system comprises a predetermined organizational relationship among the users.

12. The system of claim 11, wherein the predetermined organizational relationship comprises an organizational chart among the users and wherein the correlation coefficient between a pair of users is a function of the number of levels between the pair.

13. The system of claim 11, wherein the processor calculates the predicted user rating of an item i for a user X in accordance with the relationship:

$$P_0 + \frac{\sum_{y \in raters}(S_y^i - P_0)\alpha_{xy}}{\sum_y |\alpha_{xy}|},$$

where $S_y^i$ is the rating of each user y who has rated the item i, $P_0$ is a predetermined value and $\alpha_{xy}$ is the correlation coefficient between the user X and user Y.

14. The system of claim 13, wherein the initial correlation coefficient for each pair of users X and Y in the system comprises the relationship $$\alpha_{xy}(0) = \alpha_0^n, \text{ where } 0 < \alpha_0 < 1,$$

where n is the number of levels separating user X and user Y.

15. The system of claim 11, wherein the initial correlation coefficient for each user in the system further comprises user specified correlations between pairs of users in the organization.

16. The system of claim 11, wherein the processor, responsive to receiving a user rating for the item, uses the user rating to update the user's correlation coefficients.

17. The system of claim 16, wherein the processor updates the correlation $\alpha_{xy}$ in accordance with the relationship:

$$\alpha_{xy}(T_{xy}+1) = \frac{N\sigma_x(T_{xy})\sigma_y(T_{xy})\alpha_{xy}(T_{xy}) + (S_x - P_0)(S_y - P_0)}{(N+1)\sigma_x(T_{xy}+1)\sigma_y(T_{xy}+1)} \text{ where}$$

$$\sigma_x(T_{xy}+1) = \frac{\sqrt{N\sigma_x^2(T_{xy}) + (S_x - P_0)^2}}{\sqrt{N+1}},$$

$$\sigma_y(T_{xy}+1) = \frac{\sqrt{N\sigma_y^2(T_{xy}) + (S_y - P_0)^2}}{\sqrt{N+1}}$$

are the individual update formulas for user X's and user Y's ratings distributions, respectively over items rated in common, $T_{xy}$ is the weight attributed to a prior estimate of the user X to user y correlation, and N is a function of the users X and Y and $T_{xy}$.

18. The system of claim 17, wherein the processor, responsive to an updated rating by a user, calculates a backtrack to remove the effect of the rating on all correlations values that have taken it into account.

19. The system of claim 18, wherein the backtrack calculation is made in accordance with the relationship:

$$\alpha_{xy}(T_{xy}-1) = \frac{N\sigma_x(T_{xy})\sigma_y(T_{xy})\alpha_{xy}(T_{xy}) - (S_x - P_0)(S_y - P_0)}{(N-1)\sigma_x(T_{xy}-1)\sigma_y(T_{xy}-1)}, \text{ where}$$

$$\sigma_x(T_{xy}-1) = \frac{\sqrt{N\sigma_x^2(T_{xy}) - (S_x - P_0)^2}}{\sqrt{N-1}},$$

$$\sigma_y(T_{xy}-1) = \frac{\sqrt{N\sigma_y^2(T_{xy}) - (S_y - P_0)^2}}{\sqrt{N-1}}$$

are the individual update formulas for user's X and user's Y ratings distributions, respectively over items rated in common, $T_{xy}$ is the weight attributed to the prior estimate of the user to user correlation, and N is a function of the users and $T_{xy}$.

20. A method of predicting a user's rating for an item in a collaborative filtering system, comprising:

providing an initial correlation coefficient for each pair of users in the system; wherein the plurality of users are members of a predetermined organization; and wherein the correlation coefficient for each user in the system comprises a predetermined organizational relationship among the users;

determining ratings for items rated by other users in the system; and calculating the weighted average of all the ratings for the item, wherein the weighted average is the sum of the product of a rating and its respective correlation coefficient divided by the sum of the correlation coefficients to provide a predicted user rating.

21. The method of claim 20, wherein the predetermined organizational relationship comprises a formal organizational chart among the users and wherein the correlation coefficient for a pair of users is scaled according to the number of steps to reach a common ancestor.

22. The method of claim 20, wherein the predetermined organizational relationship comprises a map of competencies in the organization, wherein at least one user is an expert and wherein all non-expert users have a higher initial correlation with the expert than with another non-expert.

23. The method of claim 20, wherein the predetermined organizational relationship comprises a formal organizational chart among the users and further including a map of competencies in the organization, wherein at least one user is an expert and wherein all non-experts users have a higher initial correlation with the expert than with another non-expert.

24. The method of claim 20, wherein at least one user is an advisor selected by another user and wherein the initial correlation between the user and his advisor is higher than the initial correlation between the user and non-advisors.

25. The method of claim 20, wherein at least one user is a contrary indicator selected by another user and wherein the initial correlation between the user and his contrary indicator advisor is lower than the initial correlation between the user and non-advisors.

* * * * *